United States Patent
Miura

(10) Patent No.: US 10,536,106 B2
(45) Date of Patent: Jan. 14, 2020

(54) CONTROL DEVICE OF ELECTRIC MOTOR, ELECTRIC MOTOR SYSTEM, AND CONTROL METHOD OF ELECTRIC MOTOR

(71) Applicant: FANUC CORPORATION, Yamanashi (JP)

(72) Inventor: Masaki Miura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/009,272

(22) Filed: Jun. 15, 2018

(65) Prior Publication Data

US 2018/0375460 A1 Dec. 27, 2018

(30) Foreign Application Priority Data

Jun. 22, 2017 (JP) .................................. 2017-122290

(51) Int. Cl.
*H02P 29/60* (2016.01)
*H02K 9/06* (2006.01)

(52) U.S. Cl.
CPC .............. *H02P 29/60* (2016.02); *H02K 9/06* (2013.01)

(58) Field of Classification Search
CPC .................................. H02P 29/60; H02K 9/06
USPC .................. 318/400.08, 400.04, 400.01, 700
See application file for complete search history.

(56) References Cited

U.S. PATENT DOCUMENTS

| | | | | |
|---|---|---|---|---|
| 6,291,959 B1 * | 9/2001 | Yoshida | ............... | G05B 19/404 318/567 |
| 8,330,586 B2 * | 12/2012 | Krishnamoorthy | ... | F04D 27/006 318/268 |
| 10,042,346 B2 * | 8/2018 | Tezuka | ................... | G05B 19/18 |

FOREIGN PATENT DOCUMENTS

| | | |
|---|---|---|
| CN | 103715972 A | 4/2014 |
| CN | 104901607 A | 9/2015 |
| CN | 106211706 A | 12/2016 |
| DE | 102013202434 A1 | 8/2014 |
| DE | 102016109611 A1 | 12/2016 |
| JP | 2005-80384 A | 3/2005 |
| JP | 2014-56322 A | 3/2014 |
| JP | 2017-73943 A | 4/2017 |

* cited by examiner

*Primary Examiner* — David Luo
(74) *Attorney, Agent, or Firm* — Hauptman Ham, LLP

(57) ABSTRACT

A control device capable of continuously operating an electric motor even when an abnormality occurs in a fan. The control device includes: a cooling operation information acquisition section configured to acquire cooling operation information of the fan; a cooling operation determination section configured to determine whether the cooling operation information indicates a normal cooling operation; a running information acquisition section configured to acquire running information of the electric motor; and a running control section configured to, in accordance with a determination that the cooling operation information does not indicate the normal cooling operation, control an operation of the electric motor to be in an overheat-prevented state by referring to the running information.

9 Claims, 8 Drawing Sheets

CONTROL DEVICE OF ELECTRIC MOTOR, ELECTRIC MOTOR SYSTEM, AND CONTROL METHOD OF ELECTRIC MOTOR

RELATED APPLICATIONS

The present application claims priority of Japanese Application No. 2017-122290, filed on Jun. 22, 2017, the disclosure of which is hereby incorporated by reference herein in its entirety.

BACKGROUND OF THE INVENTION

1. Field of the Invention

The present invention relates to a control device of an electric motor, an electric motor system, and a control method of an electric motor.

2. Description of the Related Art

A technology is known that detects an abnormality in a fan which cools an electric motor (as disclosed in JP 2017-073943 A, for example).

In related art, it is desirable to continue to run the electric motor as long as possible, even if an abnormality occurs in a fan motor.

SUMMARY OF THE INVENTION

In an aspect of the present disclosure, a control device of an electric motor in which a fan is installed, includes a cooling operation information acquisition section configured to acquire cooling operation information of the fan; a cooling operation determination section configured to determine whether or not the cooling operation information indicates a normal cooling operation; a running information acquisition section configured to acquire running information of the electric motor; and a running control section configured to control the running of the electric motor so as to be in an overheat-prevented state, with reference to the running information, when it is determined that the cooling operation information does not indicate a normal cooling operation.

In another aspect of the present disclosure, a method of controlling an electric motor in which a fan is installed, includes acquiring cooling operation information of the fan; determining whether or not the cooling operation information indicates a normal cooling operation; acquiring running information of the electric motor; and controlling the running of the electric motor so as to be in an overheat-prevented state, with reference to the running information, when it is determined that the cooling operation information does not indicate a normal cooling operation.

According to this disclosure, even if a temporary abnormality occurs in the cooling operation of the fan, the operation of the electric motor can continue so as not to be in an overheated state. As a result, it is possible to avoid completely stopping a work (e.g., machining) in which the electric motor 12 is being used, and the operator can repair or replace the fan 14 at a desired timing that will not obstruct the operation.

DETAILED DESCRIPTION

Figure 1:
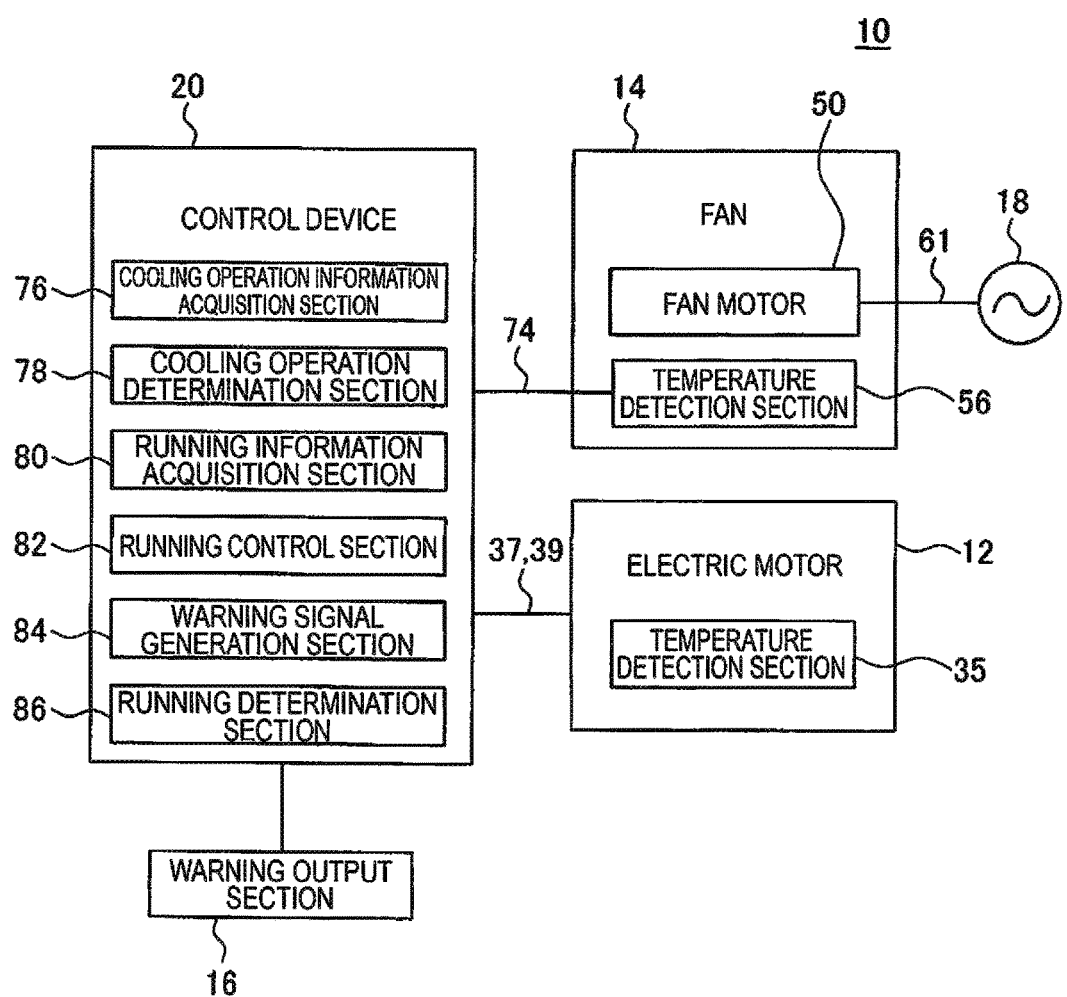
FIG. 1 is a block diagram of an electric motor system according to an embodiment.

Hereinafter, embodiments of the present disclosure will be described in detail with reference to the drawings. It should be noted that, in the various embodiments described below, similar elements are assigned the same reference numerals, and redundant explanations thereof will be omitted. Further, in the following explanation, the axial direction indicates a direction along a rotational axis O (FIG. 2) of an electric motor, the radial direction indicates a direction of a radius of a circle centered about the axis O, and the circumferential direction indicates a direction of a circumference of the circle. In addition, for convenience, the left direction in FIG. 2 is referred to as a forward direction.

Figure 2:
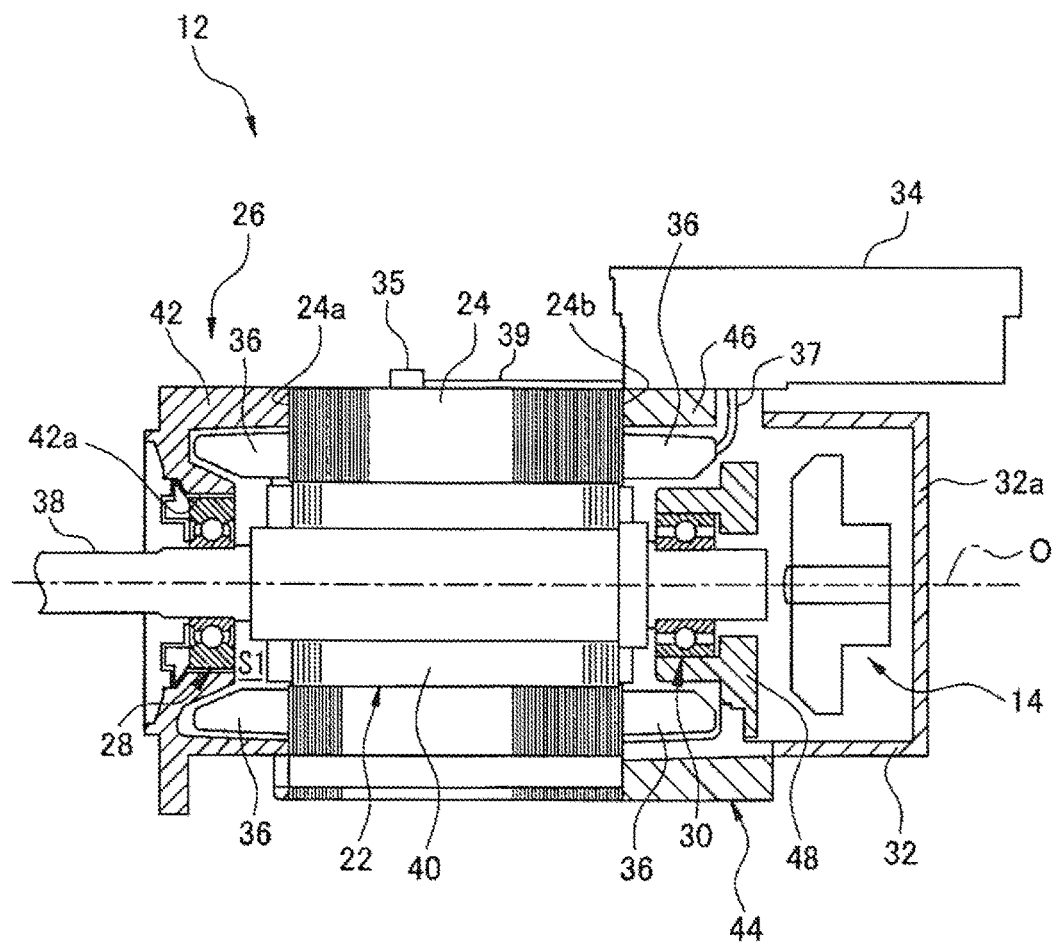
FIG. 2 is a cross-sectional view of an electric motor according to an embodiment.
Figure 3:
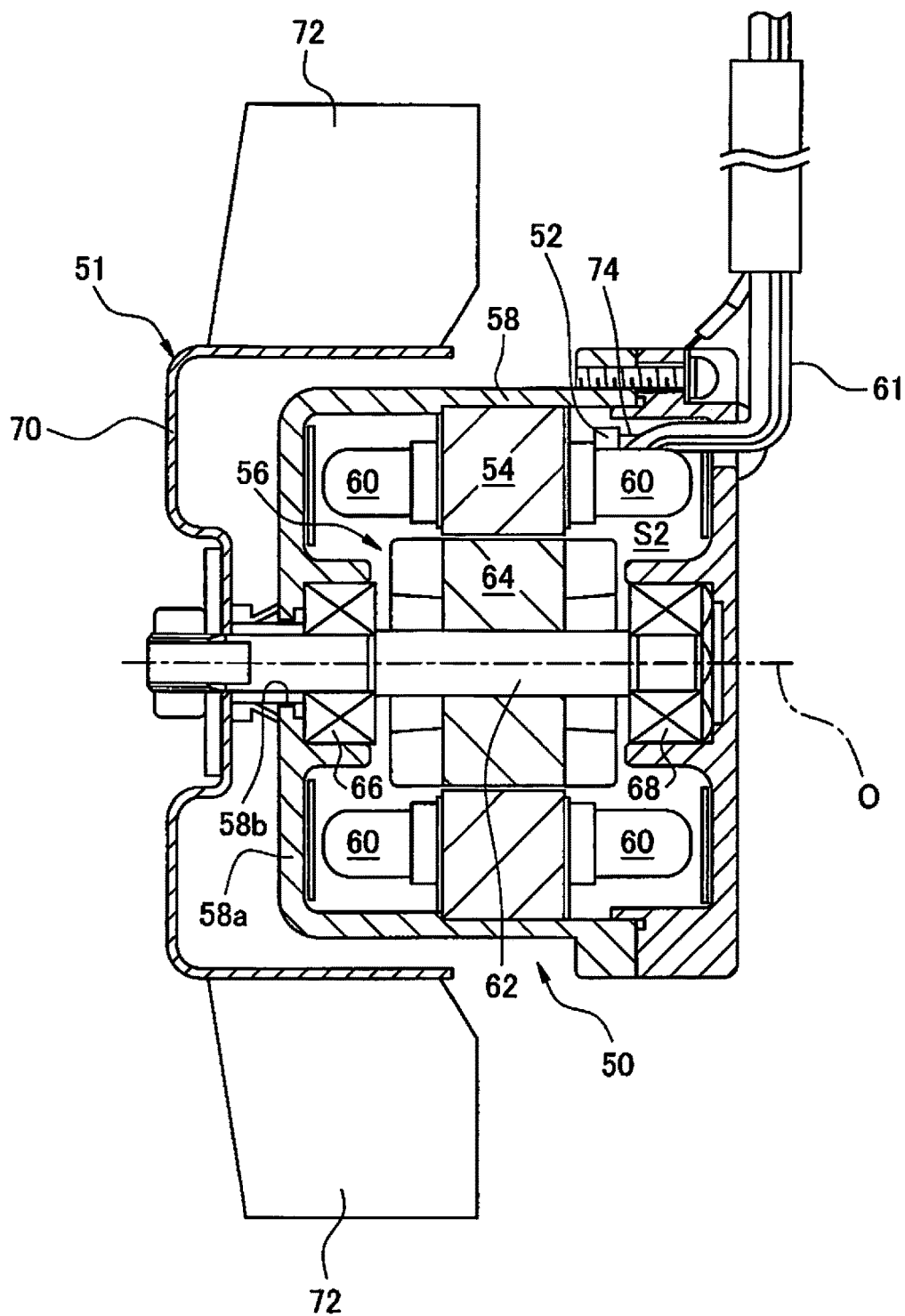
FIG. 3 is a cross-sectional view of a fan according to an embodiment.

With reference to FIG. 1 to FIG. 3, an electric motor system 10 according to an embodiment will be described. The electric motor system 10 includes an electric motor 12, a fan 14, a warning output section 16, a power source 18, and a control device 20.

As illustrated in FIG. 2, the electric motor 12 includes a rotor 22, a stator 24, a housing 26, a bearing 28, a bearing 30, a rear cover 32, a terminal box 34, and a first temperature detection section 35. The stator 24 is made of e.g. a plurality of magnetic steel sheets laminated in the axial direction.

A coil 36 is wound around the stator 24. A power cable 37 is led out from the coil 36, is wired so as to be drawn into the terminal box 34, and is electrically connected to the control device 20.

In this embodiment, the first temperature detection section 35 is installed on an outer peripheral surface of the stator 24 (or the coil 36). The first temperature detection section 35 includes e.g. a thermocouple, a thermopile, a thermistor, or a platinum resistance temperature detector, and measures the temperature at a location at which the first temperature detection section 35 is installed.

A signal cable 39 is connected to the first temperature detection section 35, is wired so as to be drawn into the terminal box 34, and is electrically connected to the control device 20. The first temperature detection section 35 transmits information of the detected temperature to the control device 20, as running information of the electric motor 12.

The rotor 22 includes a rotary shaft 38, and a rotor core 40 fixed to the radially outside of the rotary shaft 38. The rotor core 40 is disposed so as to be slightly separated radially inward from the stator 24.

The housing 26 supports the stator 24. Specifically, the housing 26 includes a front housing 42 fixed axially front side of the stator 24, and a rear housing 44 fixed axially rear side of the stator 24. The front housing 42 is fixed to an axially front end face 24a of the stator 24.

The rear housing 44 includes an annular main body 46 fixed to an axially rear end face 24b of the stator 24, and an annular bearing support 48 fixed radially inside of the main body 46.

The rear cover 32 is fixed to an axially rear end of the main body 46 of the rear housing 44. A plurality of through holes (not illustrated) are formed at an axially rear wall 32a of the rear cover 32. The rotor core 40 of the rotor 22 is housed in an interior space S1 defined by the front housing 42, the rear housing 44, the stator 24, and the rear cover 32.

The bearing 28 is interposed between a radially inside end face 42a of the front housing 42 and the rotary shaft 38, and rotatably supports the rotary shaft 38. The bearing 30 is interposed between the bearing support portion 48 of the rear housing 44 and the rotary shaft 38, and rotatably supports the rotary shaft 38 similarly to the bearing 28.

The terminal box 34 is fixed on the outer peripheral surface of the rear housing 44. The power cable 37, which supplies power to the coil 36 of the electric motor 12, is drawn into the terminal box 34. Further, a power cable 61 (FIG. 3), which supplies power to a fan motor 50 of the fan 14, and a signal cable 74 (FIG. 3), which extends from a second temperature detection section 52 (FIG. 3) provided in the fan 14, are drawn into the terminal box 34. It should be noted that the power cable 61 of the fan 14 and the signal cable 74 will be described later.

In this embodiment, the fan 14 is installed inside the rear cover 32 of the electric motor 12, and is disposed axially rearward of the stator 24 and the rotor 22, so as to be centered about the axis O.

As illustrated in FIG. 3, the fan 14 includes the fan motor 50, a rotary body 51, and the second temperature detection section 52. The fan motor 50 includes a fan stator 54, a fan rotor 56 rotatably arranged radially inside of the fan stator 54, and a fan housing 58 that supports the fan stator 54.

A coil 60 is wound around the fan stator 54. The power cable 61 is led out from the coil 60, is wired so as to be drawn into the terminal box 34, and is electrically connected to the power source 18.

The fan rotor 56 includes a rotary shaft 62, and a rotor core 64 fixed to the radially outside of the rotary shaft 62. The rotary shaft 62 is supported by bearings 66 and 68 so as to be able to rotate about the axis O.

The fan housing 58 is hollow and defines an interior space S2. The fan stator 54 and the rotor core 64 are housed in the interior space S2. The bearings 66 and 68 are fixed to the fan housing 58. The rotary shaft 62 protrudes axially front ward from the fan housing 58 through a through hole 58b formed at an axially front wall 58a of the fan housing 58.

The rotary body 51 includes an annular portion 70, and a plurality of vanes 72 fixed to the radially outside of the annular portion 70. The annular portion 70 is fixed to the axially front end of the rotary shaft 62. The plurality of vanes 72 are disposed so as to align in the circumferential direction at substantially equal intervals.

In this embodiment, the second temperature detection section 52 is installed on the coil 60. The second temperature detection section 52 has a thermocouple, a thermopile, a thermistor, or a platinum resistance temperature detector, and measures the temperature at a location at which the second temperature detection section 52 is installed.

The signal cable 74 is connected to the second temperature detection section 52. The signal cable 74 is wired so as to be drawn into the terminal box 34, together with the power cable 61 of the fan motor 50. The signal cable 74 is electrically connected to the control device 20. The second temperature detection section 52 transmits information of the detected temperature to the control device 20, as cooling operation information of the fan 14.

With reference to FIG. 1 again, the power source 18 is e.g. a commercial AC power source, and applies an AC voltage of a predetermined frequency to the coil 60 of the fan 14, via the power cable 61. As a result, the fan rotor 56 and the rotary body 51 are rotated integrally at a predetermined rotation speed $R_{Ref}$. The warning output section 16 includes e.g. a speaker or a display, and outputs a sound or an image in accordance with a command from the control device 20.

The control device 20 controls the electric motor 12. In this embodiment, the control device 20 includes a cooling operation information acquisition section 76, a cooling operation determination section 78, a running information acquisition section 80, a running control section 82, a warning signal generation section 84, and a running determination section 86.

The control device 20 may be configured by a single computer having a processor and a memory (RAM, ROM, etc.). In this case, the processor of the control device 20 functions as the cooling operation information acquisition section 76, the cooling operation determination section 78, the running information acquisition section 80, the running control section 82, the warning signal generation section 84, and the running determination section 86.

Alternatively, the control device 20 may be configured by a plurality of computers, each of which has a processor and a memory (RAM, ROM, etc.). In this case, the respective processors of the plurality of computers may function as the respective cooling operation information acquisition section 76, the cooling operation determination section 78, the running information acquisition section 80, the running control section 82, the warning signal generation section 84, and the running determination section 86.

It should be noted that the functions of the cooling operation information acquisition section 76, the cooling operation determination section 78, the running information acquisition section 80, the running control section 82, the warning signal generation section 84, and the running determination section 86 will be described later.

Figure 4:
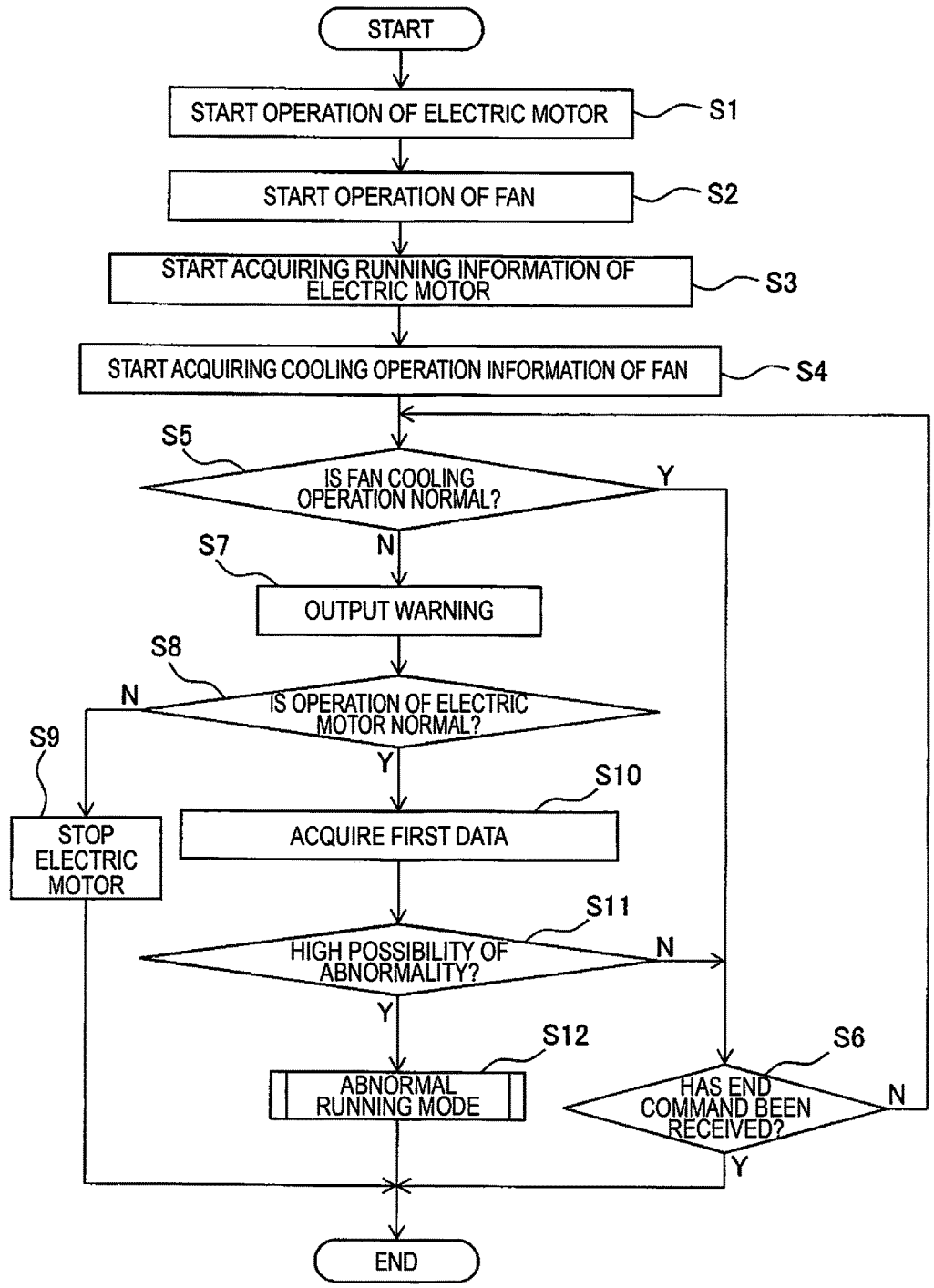
FIG. 4 is a flowchart showing an example of an operation flow of the electric motor system.

Next, an operation flow of the control device 20 will be described with reference to FIG. 4. The flow illustrated in FIG. 4 is started when the control device 20 receives an operation start command from an operator or a host controller.

At Step S1, the control device 20 starts to run the electric motor 12. At this time, the control device 20 causes the electric motor 12 to operate in a normal running mode. In the normal running mode, the control device 20 sends a current value command $I_1$ to the electric motor 12, and the electric motor 12 outputs a rotational force $P_1$ in accordance with the current value command $I_1$.

The current value command $I_1$ sent by the control device 20 in the normal running mode is set by the operator or by a computer program. In this way, the control device 20 operates the electric motor 12 in the normal running mode.

At Step S2, the control device 20 or the operator starts to operate the fan 14. As an example, the control device 20 is connected to the power source 18 so as to control the ON/OFF of the power source 18. In this case, at this Step S2, the control device 20 transmits a command to the power source 18 so as to turn ON the power source 18. As another example, at this Step S2, the operator manually turns ON the power source 18.

When the power source 18 is turned ON, the power source 18 supplies the AC voltage of the predetermined frequency to the coil 60 of the fan 14. As a result, the fan 14 rotates at the predetermined rotation speed $R_{Ref}$, and an airflow is generated in the electric motor 12. By this airflow, each component of the electric motor 12 is cooled.

At Step S3, the control device 20 starts to acquire the running information of the electric motor 12. Specifically, the control device 20 transmits a temperature detection command to the first temperature detection section 35 provided in the electric motor 12.

When the first temperature detection section 35 receives the temperature detection command, it repeatedly detects a temperature $T_1$ at the location at which it is installed, and sequentially transmits the information of the detected temperature $T_1$ to the control device 20 via the signal cable 39, as the running information of the electric motor 12.

For example, the first temperature detection section 35 may periodically measure the temperature $T_1$ at a cycle $T_1$ ($\tau_1=1$ [sec], for example], and sequentially transmit the temperature $T_1$ to the control device 20. The control device 20 sequentially stores in the memory the temperature $T_1$ received from the first temperature detection section 35.

The temperature $T_1$ detected at this time is one item of information indicative of the running state of the electric motor 12 in operation (i.e., the running information). Thus, in this embodiment, the control device 20 functions as the running information acquisition section 80 (FIG. 1) configured to acquire the running information of the electric motor 12.

At Step S4, the control device 20 starts to acquire the cooling operation information of the fan 14. Specifically, the control device 20 transmits a temperature detection command to the second temperature detection section 52 provided in the fan 14.

When the second temperature detection section 52 receives the temperature detection command, it repeatedly detects a temperature $T_2$ at the location at which it is installed, and sequentially transmits the information of the detected temperature $T_2$ to the control device 20 via the signal cable 74, as the cooling operation information of the fan 14.

For example, the second temperature detection section 52 may periodically measure the temperature $T_2$ at a cycle $\tau_2$ ($\tau_2=1$ [sec], for example), and sequentially transmit the temperature $T_2$ to the control device 20. The control device 20 sequentially stores in the memory the temperature $T_2$ received from the second temperature detection section 52.

The temperature $T_2$ detected at this time is one item of the information indicative of the cooling operation state of the working fan 14 in operation (i.e., the cooling operation information). More specifically, as the electric motor 12 operates, the rotation of the rotary body 51 or the fan rotor 56 of the fan 14 may possibly be obstructed, due to which, the rotation speed of the fan 14 may decrease from the rotation speed $R_{Ref}$.

Such obstruction of the rotation of the rotary body 51 or the fan rotor 56 may be caused e.g. by a foreign material, such as cutting fluid, attaching to the rotary body 51 or the fan rotor 56 during operation of the electric motor 12.

If the rotation speed of the fan 14 decreases, the load on the fan motor 50 increases, as a result of which, the temperature of the fan motor 50 rises. On the other hand, the airflow generated in the electric motor 12 decreases, as a result of which the performance of the fan 14 to cool the electric motor 12 deteriorates.

In this way, since there is a high correlation between the temperature $T_2$ detected by the second temperature detection section 52 and the cooling operation state of the fan 14, the temperature $T_2$ can be used as the cooling operation information of the fan 14. Thus, in this embodiment, the control device 20 functions as the cooling operation information acquisition section 76 (FIG. 1) configured to acquire the cooling operation information of the fan 14.

At Step S5, the control device 20 determines whether or not the cooling operation information of the fan 14 indicates a normal cooling operation. Specifically, the control device 20 determines whether or not the temperature $T_2$ most-recently acquired from the second temperature detection section 52 is lower than a threshold value $T_{2\alpha}$ (i.e., $T_2<T_{2\alpha}$).

The threshold value $T_{2\alpha}$ is predetermined by the operator, and is stored in the memory of the control device 20. When $T_2<T_{2\alpha}$ is satisfied, the control device 20 determines that the cooling operation information of the fan 14 indicates the normal cooling operation (i.e., determines YES), and proceeds to Step S6.

On the other hand, when $T_2$ is equal to or greater than the threshold value $T_{2\alpha}$, (i.e., $T_2 \geq T_{2\alpha}$), the control device 20 determines that the cooling operation information of the fan 14 does not indicate the normal cooling operation (i.e., determines NO), and proceeds to Step S7. Thus, in this embodiment, the control device 20 functions as the cooling operation determination section 78 (FIG. 1) configured to determine whether or not the cooling operation information indicates the normal cooling operation.

At Step S6, the control device 20 determines whether or not it receives an operation end command from the operator or the host controller. If the control device 20 determines that it receives the operation end command (i.e., determines YES), the control device 20 transmits a stop command to the electric motor 12, sets the current value supplied to the electric motor 12 to zero. Thereby, the operation of the electric motor 12 is stopped.

Further, if the control device 20 is connected to the power source 18 so as to control the ON/OFF of the power source 18, the control device 20 turns OFF the power source 18 and stops the cooling operation of the fan 14. Then, the control device 20 ends the flow illustrated in FIG. 4. On the other hand, if the control device 20 determines that it does not receive the operation end command (i.e., determines NO), the control device 20 returns to Step S5.

At Step S7, the control device 20 notifies to the operator via the warning output section 16 that an abnormality occurs in the cooling operation of the fan 14. Specifically, the control device 20 generates the warning signal in the form of a voice signal or an image signal. Then, the control device 20 transmits the generated warning signal to the warning output section 16.

The warning output section 16 outputs the warning sound or the warning image in accordance with the received warning signal via the speaker or the display portion. In this way, the operator can recognize that an abnormality has occurred in the cooling operation of the fan 14. Thus, in this embodiment, the control device 20 functions as the warning signal generation section 84 (FIG. 1) configured to generate the warning signal.

At Step S8, the control device 20 determines whether or not the running information of the electric motor 12 indicates the normal running of the electric motor 12. Specifically, the control device 20 determines whether or not the temperature $T_1$ most-recently acquired from the first temperature detection section 35 is lower than a threshold value $T_{1\alpha}$, (i.e., $T_1 < T_{1\alpha}$).

The threshold value $T_{1\alpha}$ is predetermined by the operator, and is stored in the memory of the control device 20. For example, the threshold value $T_{1\alpha}$ is set as a threshold value defining a boundary to determine whether the electric motor 12 is in an overheated state. In this case, when the temperature $T_1$ is equal to or greater than the threshold value $T_{1\alpha}$, (i.e., $T_1 \geq T_{1\alpha}$), the electric motor 12 is considered to be overheating.

When $T_1 < T_{1\alpha}$ is satisfied, the control device 20 determines that the running information of the electric motor 12 indicates the normal running (i.e., determines YES), and proceeds to Step S10. On the other hand, when $T_1 \geq T_{1\alpha}$ is satisfied, the control device 20 determines that the running information of the electric motor 12 does not indicate normal running (i.e., determines NO), and proceeds to Step S9.

Thus, in this embodiment, the control device 20 functions as the running determination section 86 (FIG. 1) configured to determine whether the running information of the electric motor 12 indicates normal running.

At Step S9, the control device 20 stops the operation of the electric motor 12. Specifically, the control device 20 transmits the stop command to the electric motor 12, and sets the current value supplied to the electric motor 12 to zero. In this way, the operation of the electric motor 12 is stopped. Then, the control device 20 ends the flow illustrated in FIG. 4.

At Step S10, the control device 20 acquires first data indicating a possibility that the electric motor 12 is in an overheated state. Below, the technical significance of the first data will be explained with reference to FIG. 6.

Figure 6:
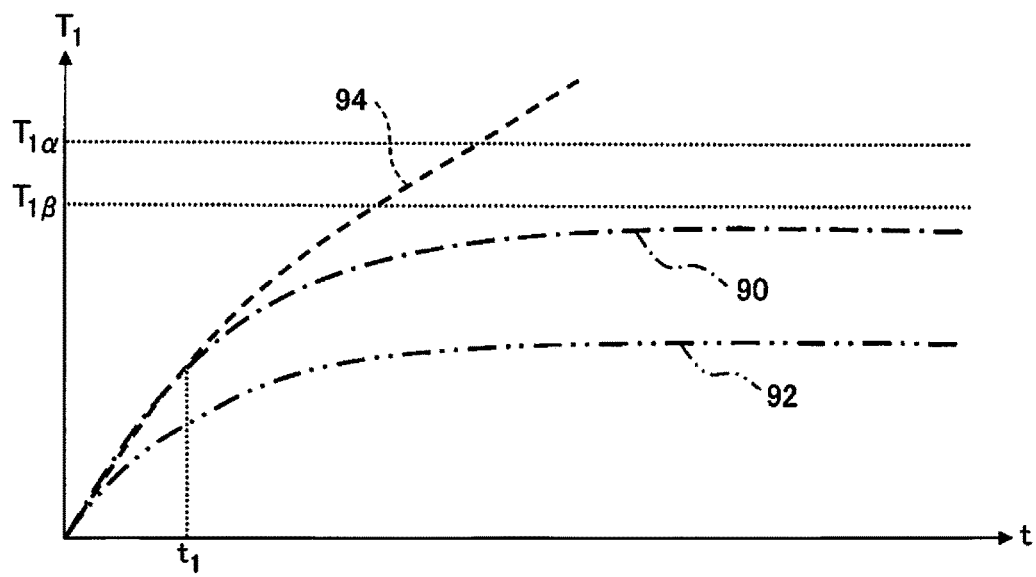
FIG. 6 is a graph showing a relationship between a temperature of the electric motor and time, in which the vertical axis indicates the temperature, while the horizontal axis indicates the time.

A one-dot chain line 90 in FIG. 6 indicates a relationship between a time t and the temperature $T_1$ when the cooling operation of the fan 14 is normal and the electric motor 12 is run at a rated current value. In this relationship 90, after the electric motor 12 starts to run, the temperature $T_1$ increases with time and approaches asymptotically to a predetermined saturation temperature $T_1$ ($<T_{1\alpha}$).

A two-dot chain line 92 in FIG. 6 indicates a relationship between the time t and the temperature $T_1$ when an abnormality occurs in the cooling operation of the fan 14 but the electric motor 12 is run at a current value that is significantly smaller than the rated current value. In this relationship 92, the temperature $T_1$ of the electric motor 12 reaches saturation at a temperature that is significantly lower than the saturation temperature $T_{1\beta}$.

On the other hand, a broken line 94 in FIG. 6 indicates a relationship between the time t and the temperature $T_1$ when an abnormality occurs in the cooling operation of the fan 14 at a time point $t_1$ during the fan 14 is run at the rated current value, and the electric motor 12 continues to be run at the rated current value even after the abnormality occurs.

In this relationship 94, after the electric motor 12 begins running, the temperature $T_1$ rapidly increases and exceeds the saturation temperature $T_{1\beta}$ and the overheat temperature $T_{1\alpha}$ (i.e. the above-described threshold value $T_{1\alpha}$). In this case, the electric motor 12 is in an overheated state.

In this embodiment, at Step S10, the control device 20 acquires the first data in order to quantitatively evaluate the possibility that the running of the electric motor 12 is in an overheated state. As an example, the control device 20 calculates, as the first data, a difference $\delta_1$ ($=T_{1\alpha}-T_1$) between the most-recently acquired temperature $T_1$ and the overheat temperature $T_{1\alpha}$.

The smaller this difference $\delta_1$, the greater the possibility of the electric motor 12 being an overheated state, and therefore the difference $\delta_1$ can be used as the first data $\delta_1$ indicating the possibility that the running of the electric motor 12 is in an overheated state.

As another example, the control device 20 calculates a degree of increase of the temperature $T_1$ with respect to the time t, as the first data. For example, using a temperature $T_{1(n)}$ most-recently acquired from the first temperature detection section 35, a temperature $T_{1(n-1)}$ acquired from the first temperature detection section 35 immediately before the temperature $T_{1(n)}$, and the measurement cycle $\tau 1$, the control device 20 calculates a degree of increase $\delta T_1/\delta t$ ($=(T_{1(n)}-T_{1(n-1)})/\tau$).

This degree of increase $\delta T_1/\delta t$ corresponds to a gradient of the graph shown in FIG. 6. With reference to FIG. 6, it can be seen that the gradient of the relationship 94 is significantly greater than the other relationships 90 and 92 after the time point $t_1$. Therefore, the degree of increase $\delta T_1/\delta t$ can be used as the first data $\delta T_1/\delta t$ indicating the possibility that the running of the electric motor 12 is in an overheated state.

As a further example, the control device 20 may calculate both $\delta_1$ and $\delta T_1/\delta t$ as the first data. In this way, the control device 20 acquires the first data ($\delta_1$, $\delta T_1/\delta t$) and stores it in the memory.

At Step S11, on the basis of the first data ($\delta_1$, $\delta T_1/\delta t$) acquired at Step S10, the control device 20 determines whether or not the possibility that the running of the electric motor 12 is in an overheated state is high.

As an example, when the first data $\delta_1$ ($=T_{1\alpha}-T_1$) is calculated at Step S10, at this Step S11, the control device 20 determines whether or not the first data $\delta_1$ is equal to or less than a threshold value $\alpha$ (i.e., $\delta_1 \leq \alpha$). The threshold value $\alpha$ is predetermined by the operator, and is stored in the memory of the control device 20.

When $\delta_1 \leq \alpha$ is satisfied, the control device 20 determines that the possibility that the running of the electric motor 12 is in an overheated state is high (i.e., determines YES), and proceeds to Step S12. On the other hand, when $\delta_1 < \alpha$ is satisfied, the control device 20 determines that the possibility that the running of the electric motor 12 is in an overheated state is low (i.e., determines NO), returns to the above-described Step S6, and continues running the electric motor 12 in the normal running mode until it determines YES at Step S6.

As another example, when the first data $\delta T_1/\delta t$ ($=(T_{1(n)}-T_{1(n-1)})/\tau$) is calculated at Step S10, at this Step S11, the control device 20 determines whether or not the first data $\delta T_1/\delta t$ is equal to or greater than a threshold value $\beta$ (i.e., $\delta T_1/\delta t \geq \beta$). The threshold value $\beta$ is predetermined by the operator, and is stored in the memory of the control device 20.

The control device 20 determines YES when $\delta T_1/\delta t \geq \beta$ is satisfied, and proceeds to Step S12. On the other hand, the control device 20 determines NO when $\delta T_1/\delta t < \beta$ is satisfied, and returns to the above-described Step S6.

As yet another example, when both $\delta_1$ and $\delta T_1/\delta t$ are acquired as the first data at Step S10, the control device 20 may determine the possibility of the electric motor 12 being in an overheated state, on the basis of $\delta_1$ and $\delta T_1/\delta t$. For example, the control device 20 may determine YES when $\delta_1 \leq \alpha$ or $\delta T_1/\delta t \geq \beta$, while determining NO when $\delta_1 < \alpha$ and $\delta T_1/\delta t < \beta$.

At Step S12, the control device 20 runs the electric motor 12 in an abnormal running mode. This Step S12 will be described with reference to FIG. 5. After beginning Step S12, at Step S21, the control device 20 reduces the output of the electric motor 12.

Specifically, the control device 20 changes the current value command transmitted to the electric motor 12 from the current value command $I_1$ to a second current value command $I_2$, and sends the second current value command $I_2$ to the electric motor 12. The second current value command $I_2$ is for running the electric motor 12 at a lower current value than the current value command $I_1$. As a result, the electric motor 12 outputs a second rotational force $P_2$ (<$P_1$) in accordance with the second current value command $I_2$.

At Step S22, the control device 20 acquires second data in order to quantitatively evaluate a possibility that the temperature $T_1$ of the electric motor 12 exceeds the saturation temperature $T_{1\beta}$. As an example, the control device 20 calculates, as the second data, a difference $\delta_2$ (=$T_{1\beta}-T_1$) between the most-recently acquired temperature $T_1$ and the saturation temperature $T_{1\beta}$.

The smaller this difference $\delta_2$, the greater the possibility of the temperature $T_1$ exceeding the saturation temperature $T_{1\beta}$, and therefore the difference $\delta_2$ can be used as the second data $\delta_2$ indicating the possibility that the temperature $T_1$ exceeds the saturation temperature $T_{1\beta}$.

As another example, the control device 20 calculates the degree of increase $\delta T_1/\delta t$ (=$(T_{1(n)}-T_{1(n-1)})/\tau$) of the temperature $T_1$ with respect to time, as the second data. As yet another example, the control device 20 may calculate both $\delta_2$ and $\delta T_1/\delta t$ as the second data. The control device 20 acquires the second data ($\delta_2$, $\delta T_1/\delta t$) and stores it in the memory.

At Step S23, on the basis of the second data ($\delta_2$, $\delta T_1/\delta t$) acquired at Step S22, the control device 20 determines whether or not the possibility that the temperature $T_1$ exceeds the saturation temperature $T_{1\beta}$ is high.

As an example, when the second data $\delta_2$ (=$T_{1\beta}-T_1$) is calculated at Step S22, at this Step S23, the control device 20 determines whether or not the second data $\delta_2$ is equal to or less than a threshold value $\gamma$ (i.e., $\delta_2 \leq \gamma$). The threshold value $\gamma$ is predetermined by the operator, and is stored in the memory of the control device 20.

When $\delta_2 \leq \gamma$ is satisfied, the control device 20 determines that the possibility of the temperature $T_1$ exceeding the saturation temperature $T_{1\beta}$ is high (i.e., determines YES), and returns to Step S21. On the other hand, when $\delta_2 > \gamma$ is satisfied, the control device 20 determines that the possibility of the temperature $T_1$ exceeding the saturation temperature $T_{1\beta}$ is low (i.e., determines NO), and proceeds to Step S24.

As another example, when the second data $\delta T_1/\delta t$ is calculated at Step S22, at this Step S23, the control device 20 determines whether or not the second data $\delta T_1/\delta t$ is equal to or greater than a threshold value $\epsilon$ (i.e., $\delta T_1/\delta t \geq \epsilon$). The threshold value $\epsilon$ is predetermined by the operator, and is stored in the memory of the control device 20. It should be noted that the threshold value $\epsilon$ may be the same as or different from the above-described threshold value $\beta$.

The control device 20 determines YES when $\delta T_1/\delta t \geq \epsilon$ is satisfied, and returns to Step S21. On the other hand, the control device 20 determines NO when $\delta T_1/\delta t < \epsilon$ is satisfied, and proceeds to Step S24.

As yet another example, when both $\delta_2$ and $\delta T_1/\delta t$ are acquired as the second data at Step S21, the control device 20 may determine the possibility of the temperature $T_1$ exceeding the saturation temperature $T_{1\beta}$ on the basis of $\delta_2$ and $\delta T_1/\delta t$. For example, the control device 20 may determine YES when $\delta_2 \leq \gamma$ or $\delta T_1/\delta t \geq \epsilon$, while determining NO when $\delta_2 > \gamma$ and $\delta T_1/\delta t < \epsilon$.

In this way, the control device 20 repeats Step S21 to Step S23 until it determines NO at Step S23. The control device 20 reduces the output of the electric motor 12 in a stepwise manner each time the control device 20 executes Step S21.

Specifically, the control device 20 changes the current value command transmitted to the electric motor 12 from an $m^{th}$ current value command $I_m$ to an $(m+1)^{th}$ current value command $I_{m+1}$, and sends to the electric motor 12. The $(m+1)^{th}$ current value command $I_{m+1}$ is for running the electric motor 12 at a current value lower than the $m^{th}$ current value command $I_m$. As a result, the electric motor 12 outputs an $(m+1)^{th}$ rotational force $P_{m+1}$ (<$P_m$) in accordance with the $(m+1)^{th}$ current value command $I_{m+1}$.

Figure 7:
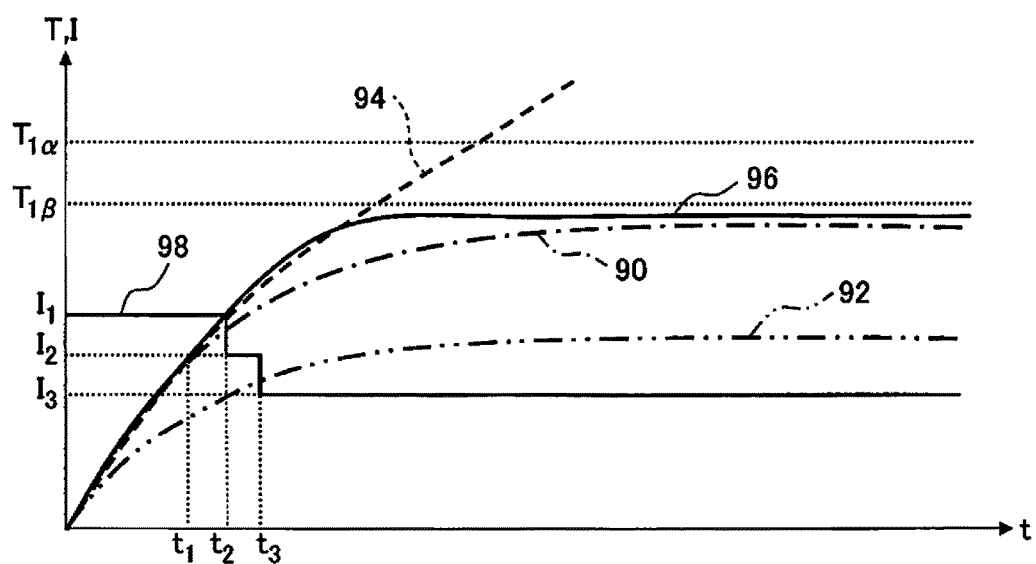
FIG. 7 is a graph showing a relationship between the temperature of the electric motor and time, and a relationship between a current value of the electric motor and time, in which the vertical axis indicates the temperature and the current value, while the horizontal axis indicates the time.

Such a running control of the electric motor 12 will be described with reference to FIG. 7. A solid line 96 in FIG. 7 indicates a relationship between the temperature $T_1$ and the time t when the electric motor 12 is run in the abnormal running mode. A solid line 98 in FIG. 7 indicates a relationship between the current value I and the time t when the electric motor 12 is run in the abnormal running mode. Further, in FIG. 7, for comparison, the relationships 90, 92, and 94 shown in FIG. 6 are also shown.

At a time point $t_2$, the control device 20 reduces the current value I of the electric motor 12 from the current value $I_1$ to the current value $I_2$ (carrying out Step S21 for a first time). Then, at a time point $t_3$, the control device 20 further reduces the current value I of the electric motor 12 from the current value $I_2$ to a current value $I_3$ (carrying out Step S21 for a second time).

In this way, the control device 20 controls the current value I of the electric motor 12 with reference to the temperature $T_1$ and the saturation temperature $T_{1\beta}$. Due to this, as shown by the relationship 96 in FIG. 7, the temperature $T_1$ of the electric motor 12 approaches asymptotically to the saturation temperature $T_{1\beta}$ so as not to exceed the saturation temperature $T_{1\beta}$, as a result of which, overheating by exceeding the saturation temperature $T_{1\alpha}$ is prevented.

Thus, in this embodiment, the control device 20 functions as the running control section 82 (FIG. 1) configured to control the running of the electric motor 12 with reference to the running information (the temperature $T_1$) so as to be in an overheat-prevented state.

At Step S24, similarly to the above-described Step S6, the control device 20 determines whether it receives the operation end command. When the control device 20 determines YES, the control device 20 stops the running of the electric motor 12 (and the power source 18), ends Step S12 illustrated in FIG. 5, and thus ends the flow illustrated in FIG. 4. On the other hand, when the control device 20 determines NO, the control device 20 returns to step S23.

As described above, in this embodiment, the control device 20 controls the running of the electric motor 12 so as to be in the overheat-prevented state with reference to the running information (the temperature $T_1$) of the electric motor 12, when the control device 20 determines that the cooling operation information (the temperature $T_2$) of the fan 14 does not indicate the normal cooling operation (i.e., determines NO at Step S5).

According to this configuration, even when an abnormality occurs in the cooling operation of the fan 14, the running of the electric motor 12 can be continued so as not to become overheated. As a result, it is possible to avoid completely stopping an operation (e.g., machining) using the electric motor 12, and the operator can repair or replace the fan 14 at a desired timing that will not obstruct the operation.

Further, in this embodiment, when the control device 20 determines NO at Step S5, the control device 20 generates the warning signal for notifying the abnormality in the cooling operation of the fan 14, and notifies the operator. According to this configuration, the operator can reliably recognize that an abnormality has occurred in the fan 14.

Further, in this embodiment, the control device 20 acquires the temperature $T_2$ detected by the second temperature detection section 52 as the cooling operation information of the fan 14. As described above, since there is a high degree of correlation between the temperature $T_2$ and the cooling operation state of the fan 14, the control device 20 can determine whether the cooling operation of the fan 14 is normal with using the temperature $T_2$ in a quantitative and highly accurate manner, at Step S5.

In addition, in this embodiment, the control device 20 determines whether the running information (the temperature $T_1$) of the electric motor 12 is normal (Step S8), and the control device 20 stops the operation of the electric motor 12 (Step S9) if it determines that the running information is not normal (i.e., determines NO at Step S8). According to this configuration, overheating of the electric motor 12 can be reliably detected, and it is possible to immediately stop the operation of the electric motor 12.

Further, in this embodiment, by executing the above-described Step S21 to Step S23, the control device 20 controls the operation of the electric motor 12 such that the temperature $T_1$ of the electric motor 12 does not exceed the saturation temperature $T_{1\beta}$.

According to this configuration, the electric motor 12 can be reliably prevented from overheating, and the output of the electric motor 12 can be increased to a maximum within a range in which the overheat-prevented state of the electric motor 12 is maintained. Thus, even when an abnormality occurs in the fan 14, it is possible to maximize work efficiency.

Further, in this embodiment, the control device 20 carries out the abnormal running mode at Step S12 only when it determines YES at Step S11. According to this configuration, it is possible to control the electric motor 12 so as to be in the overheat-prevented state at Step S12 when the possibility of the electric motor 12 being in the overheated state is high. On the other hand, the electric motor 12 can be operated in the normal running mode such that the output of the electric motor 12 can be prevented from decreasing excessively when the possibility of the overheated state is low (e.g., in the case of the relationship 92 in FIG. 6).

Figure 8:
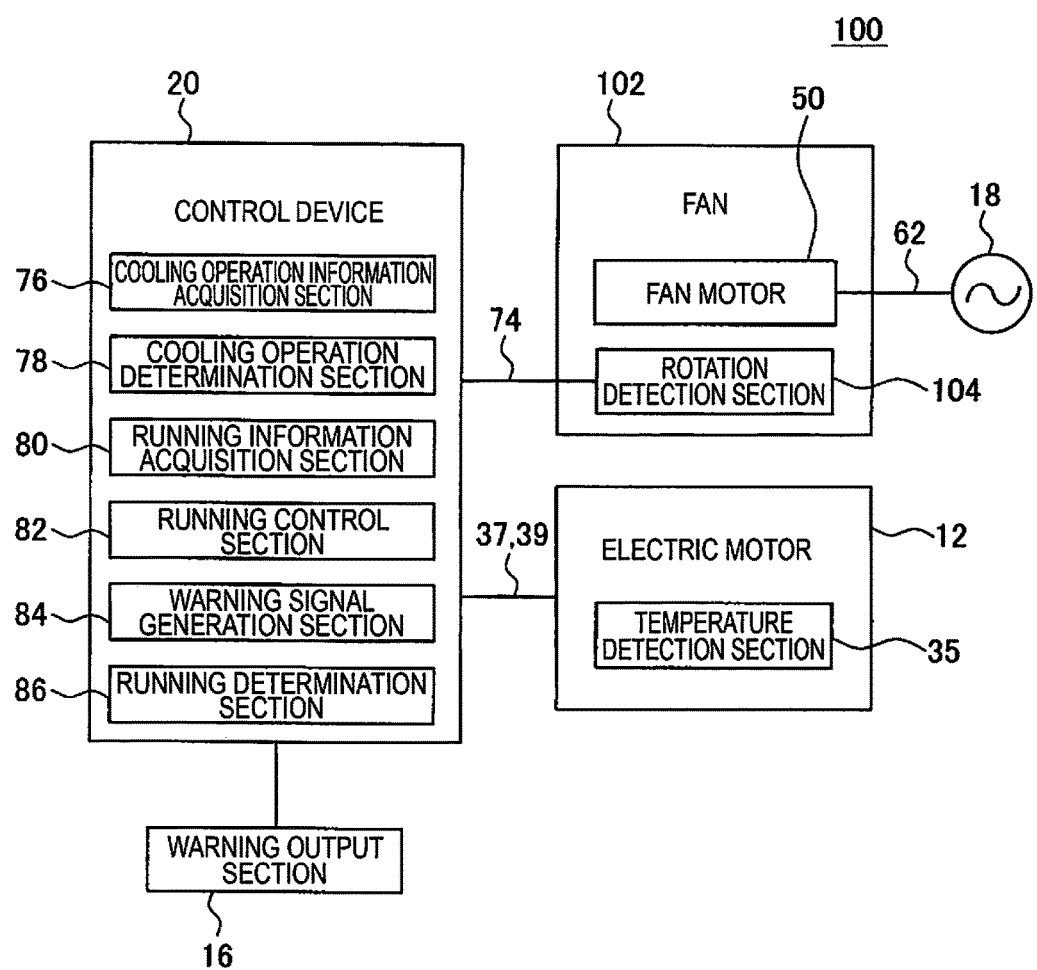
FIG. 8 is a block diagram of an electric motor system according to another embodiment.

Next, an electric motor system 100 according to another embodiment will be described with reference to FIG. 8. The electric motor system 100 is different from the above-described electric motor system 10 in a fan 102. The fan 102 according to this embodiment is different from the above-described fan 14 in that the fan 102 includes a rotation detection section 104 instead of the second temperature detection section 52.

The rotation detection section 104 includes e.g. an encoder or a Hall element, and measures the rotation speed of the fan 102. Specifically, the rotation detection section 104 is disposed in the vicinity of the fan rotor 56 or the rotary body 51 of the fan 102, and measures the rotation speed of the fan rotor 56 or the rotary body 51. The rotation detection section 104 transmits, as cooling operation information of the fan 102, the information of the detected rotation speed to the control device 20 via the signal cable 74.

Next, an operation flow of the electric motor system 100 will be described with reference to FIG. 4 and FIG. 5. The control device 20 of the electric motor system 100 carries out the operation flow illustrated in FIG. 4 and FIG. 5. The operation flow of the electric motor system 100 differs from the above-described embodiment in Steps S4 and S5.

At Step S4, the control device 20 functions as the cooling operation information acquisition section 76, and starts to acquire the cooling operation information of the fan 102. Specifically, the control device 20 transmits a rotation detection command to the rotation detection section 104 provided in the fan 102.

When the rotation detection section 104 receives the rotation detection command, the rotation detection section 104 repeatedly (e.g., at a cycle $\tau_3$) measures a rotation speed R of the fan 102, and sequentially transmits, as the cooling operation information of the fan 102, the information of the detected rotation speed R to the control device 20 via the signal cable 74. The control device 20 sequentially stores the rotation speed R received from the rotation detection section 104 in the memory.

Since the rotation speed R of the fan 102 is proportional to the airflow generated by the fan 102 in the electric motor 12, there is a high correlation between the rotation speed R and the cooling operation state of the fan 102. Therefore, the rotation speed R can be used as the information indicating the cooling operation state of the working fan 102 (i.e., the cooling operation information).

At Step S5, the control device 20 functions as the cooling operation determination section 78, and determines whether or not the cooling operation information of the fan 102 indicates the normal cooling operation. Specifically, the control device 20 determines whether or not the rotation speed R most-recently acquired from the rotation detection section 104 is higher than a threshold value $R_\alpha$ (i.e., $R > R_\alpha$).

The threshold value $R_\alpha$ is predetermined by the operator as a value lower than the above-described rotation speed $R_{Ref}$ (i.e., $R_\alpha > R_{Ref}$), and is stored in the memory of the control device 20. When $R > R_\alpha$ is satisfied, the control device 20 determines that the cooling operation information of the fan 102 indicates the normal cooling operation (i.e., determines YES), and proceeds to Step S6.

On the other hand, when R is equal to or less than the threshold value $R_\alpha$, (i.e., $R \leq R_\alpha$), the control device 20 determines that the cooling operation information of the fan 102 does not indicate the normal cooling operation (i.e., determines NO), and proceeds to Step S7. After Step S5, the control device 20 sequentially carries out Step S6 to Step S12, similarly as the above-described embodiment.

In this embodiment, the control device 20 acquires the rotation speed R detected by the rotation detection section 104 as the cooling operation information of the fan 102. As described above, since there is a high degree of correlation between the rotation speed R and the cooling operation state of the fan 102, the control device 20 can determine whether the cooling operation of the fan 102 is normal with using the rotation speed R in a quantitative and highly accurate manner, at Step S5.

Figure 9:
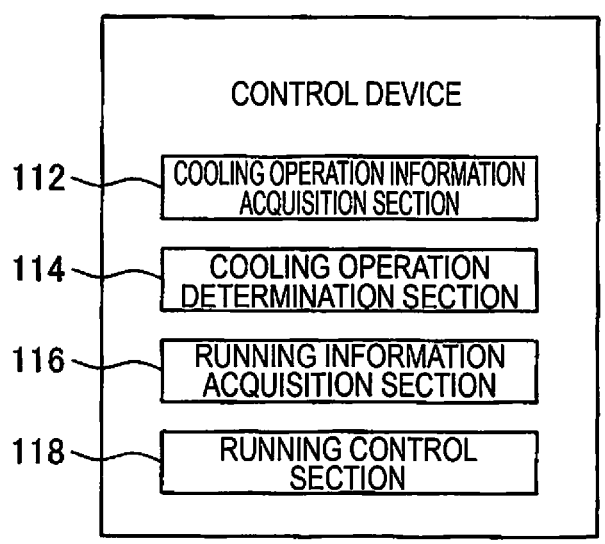
FIG. 9 is a block diagram of a control device according to another embodiment.

It should be noted that the warning signal generation section 84 and the running determination section 86 can be omitted from the above-described control device 20. Such a control device 110 is illustrated in FIG. 9. The control device 110 includes a cooling operation information acquisition section 112, a cooling operation determination section 114, a running information acquisition section 116, and a running control section 118.

The control device 110 can be configured by a single computer having a processor and a memory (RAM, ROM, etc.). In this case, the processor of the control device 110 functions as the cooling operation information acquisition section 112, the cooling operation determination section 114, the running information acquisition section 116, and the running control section 118.

Alternatively, the control device 110 may be configured by a plurality of computers, each having a processor and a memory (RAM, ROM, etc.). In this case, the respective processors of the plurality of computers may functions as the respective cooling operation information acquisition section 112, the cooling operation determination section 114, the running information acquisition section 116, and the running control section 118.

The cooling operation information acquisition section 112 acquires the cooling operation information of the fan 14, 102 (e.g., the temperature $T_2$ or the rotation speed R). The cooling operation determination section 114 determines whether or not the cooling operation information indicates the normal cooling operation. For example, similarly to the above-described embodiment, the cooling operation determination section 114 determines whether the cooling operation information indicates the normal cooling operation by comparing the cooling operation information with a predetermined threshold value.

The running information acquisition section 116 acquires the running information (e.g., the temperature $T_1$) of the electric motor 12. When the cooling operation determination section 114 determines that the cooling operation information does not indicate the normal cooling operation, the running control section 118 controls the running of the electric motor 12 so as to be in the overheat-prevented state with reference to the running information acquired by the running information acquisition section 116.

For example, similar to the above-described embodiment, the running control section 118 controls the running of the electric motor 12 to be in the overheat-prevented state by reducing the output (e.g., the current value) of the electric motor 12 with reference to the running information.

According to this embodiment, if an abnormality occurs in the cooling operation of the fan 14, 102, it is possible to continue to run the electric motor 12 so as not to overheat. As a result, it is possible to avoid completely stopping an operation using the electric motor 12, and the operator can repair or replace the fan 14, 102 at a desired timing that will not obstruct the operation.

It should be noted that the above-described first temperature detection section 35 may be disposed at any location in the electric motor 12. Further, the first temperature detection section 35 of the electric motor 12 may be omitted, wherein the cooling operation information acquisition section 76, 112 may acquire, as the running information of the electric motor 12, a feedback (a feedback current, a load torque, etc.) of the electric motor 12, instead of the above-described temperature $T_1$. In this case, at Step S8, the control device 20, 110 compares the acquired feedback with a threshold value $\zeta$ and determines whether the operation of the electric motor 12 is normal (i.e., whether it is in an overheated state).

This threshold value $\zeta$ can be set as a feedback transmitted from the electric motor 12 when the electric motor 12 is in the overheated state. Further, in this case, at Step S10 and Step S22, the control device 20, 110 acquires the first data and the second data that are based on the feedback of the electric motor 12.

In addition, the power source 18 may not necessarily be a commercial AC power source, and may be a power source having an inverter therein, which is capable of controlling the frequency.

Further, in the above-described embodiment, the warning output section 16 is provided separate from the control device 20, but may alternatively be incorporated in the control device 20. In this case, the control device 20 may include the display or the speaker.

Figure 5:
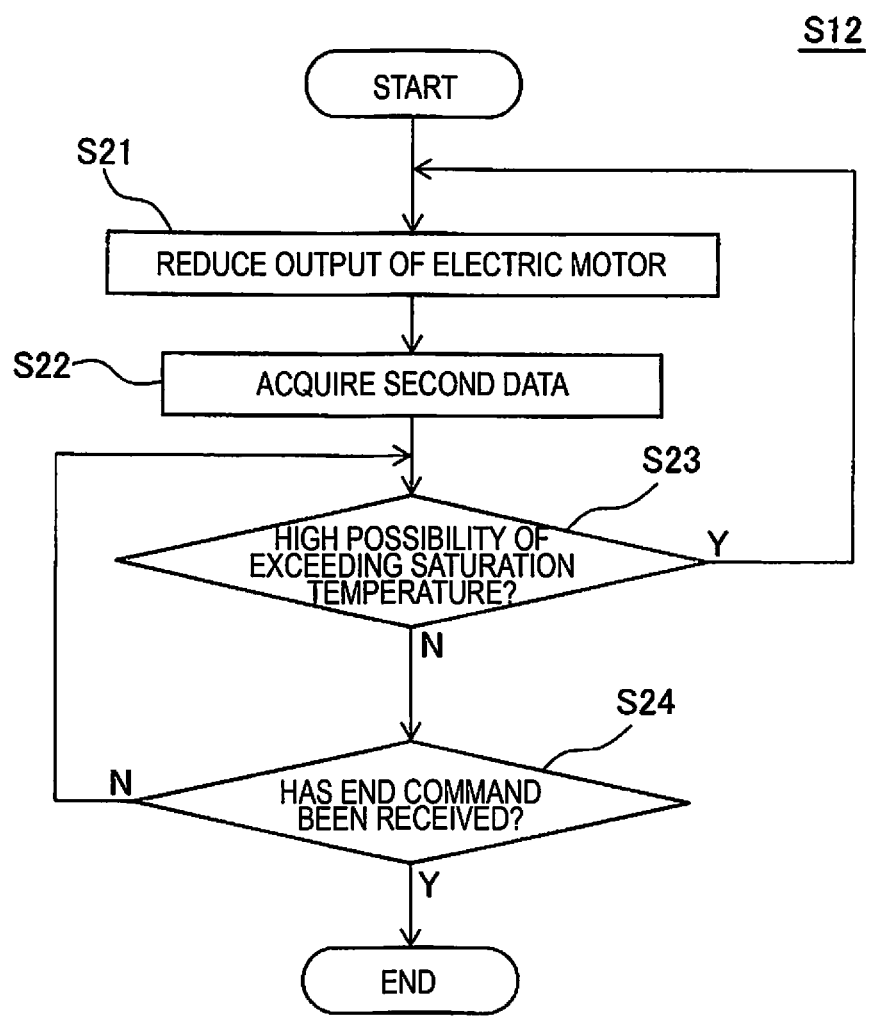
FIG. 5 is a flowchart showing an example of the flow of step S12 in FIG. 4.

Further, the control device 20, 110 may increase the output (the current value command I) of the electric motor 12 after Step S23 in FIG. 5. Further, the control device 20, 110 may send a voltage value command or a power value command to the electric motor 12, instead of the current value command I. In this case, the control device 20, 110 reduces the voltage value command or the power value command at step S21 in FIG. 5.

In addition, in the above-described embodiment, the fan 14 is installed inside the rear cover 32 axially rearward of the stator 24 and the rotor 22 of the electric motor 12.

However, the fan 14 may be installed at any position where the fan 14 can cool the electric motor 12. Further, the fan 14 is not limited to the axial fan illustrated in FIG. 3, but may be any type of fan, such as a centrifugal fan, which can generate an airflow.

While the present disclosure has been described through the embodiments, the above-described embodiments do not limit the disclosure according to the claims.

The invention claimed is:

1. A control device of an electric motor in which a fan is installed, the control device comprising:
a cooling operation information acquisition section configured to acquire cooling operation information of the fan;
a cooling operation determination section configured to determine whether or not the cooling operation information indicates a normal cooling operation;
a running information acquisition section configured to acquire running information of the electric motor; and
a running control section configured to control the running of the electric motor so as to be in an overheat-prevented state, with reference to the running information, when it is determined that the cooling operation information does not indicate the normal cooling operation.

2. The control device of claim 1, further comprising a warning signal generation section configured to generate a warning signal for notifying an abnormality in the cooling operation of the fan, when it is determined that the cooling operation information does not indicate the normal cooling operation.

3. The control device of claim 1, wherein the cooling operation information acquisition section is configured to acquire, as the cooling operation information, a rotation speed of the fan from a rotation detection section configured to detect the rotation speed of the fan,
wherein the cooling operation determination section determines that the cooling operation information does not indicate the normal cooling operation when the rotation speed of the fan is equal to or less than a predetermined threshold value.

4. The control device of claim 1, wherein the cooling operation information acquisition section is configured to acquire, as the cooling operation information, a temperature of the fan from a temperature detection section configured to detect the temperature of the fan, wherein the cooling operation determination section determines that the cooling operation information does not indicate the normal cooling operation when the temperature of the fan is equal to or greater than a predetermined threshold value.

5. The control device of claim 1, further comprising a running determination section configured to determine whether or not the running information indicates a normal running of the electric motor,
wherein the running control section stops the running of the electric motor when it is determined that the running information does not indicate the normal running of the electric motor.

6. The control device of claim 1, wherein the running information acquisition section is configured to acquire, as the running information, a temperature of the electric motor from a temperature detection section configured to detect the temperature of the electric motor.

7. The control device of claim 6, wherein the running control section is configured to control the running of the electric motor such that the temperature of the electric motor does not exceed a predetermined saturation temperature.

8. An electric motor system comprising:
an electric motor in which a fan is installed; and
a processor,
wherein the processor is configured to
acquire cooling operation information of the fan;
determine whether or not the cooling operation information indicates a normal cooling operation;
acquire running information of the electric motor; and
control a running of the electric motor so as to be in an overheat-prevented state, with reference to the running information, when it is determined that the cooling operation information does not indicate the normal cooling operation.

9. A method of controlling an electric motor in which a fan is installed, the method comprising:
acquiring cooling operation information of the fan;
determining whether or not the cooling operation information indicates a normal cooling operation;
acquiring running information of the electric motor; and
controlling a running of the electric motor so as to be in an overheat-prevented state, with reference to the running information, when it is determined that the cooling operation information does not indicate the normal cooling operation.

* * * * *